United States Patent [19]

Glas et al.

[11] Patent Number: 5,596,751
[45] Date of Patent: Jan. 21, 1997

[54] METHOD FOR PROCESSING A USER PROGRAM ON A PARALLEL COMPUTER SYSTEM

[75] Inventors: Brigitte Glas, München; Dieter Kolb, Germering; Markus Radlhammer, München, all of Germany

[73] Assignee: Siemens Aktiengesellschaft, Munich, Germany

[21] Appl. No.: 410,578

[22] Filed: Mar. 23, 1995

Related U.S. Application Data

[63] Continuation of Ser. No. 952,534, filed as PCT/DE91/00394, May 14, 1991, published as WO91/19251, Dec. 12, 1991, abandoned.

[30] Foreign Application Priority Data

Jun. 5, 1990 [DE] Germany ............... 40 18 012.3

[51] Int. Cl.$^6$ ........................................ G06F 13/00
[52] U.S. Cl. ................ 395/676; 364/DIG. 1; 364/228; 364/246.8; 364/281.3; 364/281.4
[58] Field of Search ........................................ 395/650

[56] References Cited

U.S. PATENT DOCUMENTS

| | | | |
|---|---|---|---|
| 4,177,510 | 12/1979 | Appell et al. | |
| 4,530,051 | 7/1985 | Johnson et al. | 364/200 |
| 4,893,234 | 1/1990 | Davidson et al. | 364/200 |
| 4,951,193 | 8/1990 | Muramatsu et al. | 364/200 |
| 5,129,693 | 7/1992 | Muramatsu et al. | 395/800 |

FOREIGN PATENT DOCUMENTS 0312194  4/1989  European Pat. Off.

OTHER PUBLICATIONS

"A Kernel For Distributed Programming Languages" by K.W. Ng., Interfaces in Computing, 3, Sep.–Dec. 1985, pp. 199–216.

"Multiprocessing Extensions in Spur Lisp" by B. Zorn et al, IEEE Software No. 4, Jul. 1989, pp. 41–49.

"Exception Handling In Multilisp" by R.H. Halstead et al, Proceedings of the 1985 International Conference on Parallel Processing, Aug. 20–23, 1985, pp. 822–830.

*Primary Examiner*—Kevin A. Kriess
*Assistant Examiner*—Kakali Chaki
*Attorney, Agent, or Firm*—Hill, Steadman & Simpson

[57] ABSTRACT

When a user program is processed on a parallel computer system, individual processes of the user program are executed concurrently on different processors. The situation may arise here that a first process requires data generated by a second process. The first process must then wait during processing until the second process makes this data available. In order not to extend the program runtime when translating such a user program, the instructions of a first process that access data generated by a second process open result cells in a memory area that is locked for the user mode, in which the data generated by the second process is then entered. During the processing of the user program after the translation for the parallel computer system, all instructions with memory access are examined to determine whether the addressed memory location is a result cell in the locked memory area. If this is the case, then the operating system interrupts the processing of the user program and starts an interrupt routine which has access to the result cell in the system mode. It is determined thereby whether the result is already present in the result cell, and in this case the result is made available to the process. Otherwise, the first process remains interrupted until the result supplied by the other process has been entered in the result cell.

6 Claims, 3 Drawing Sheets

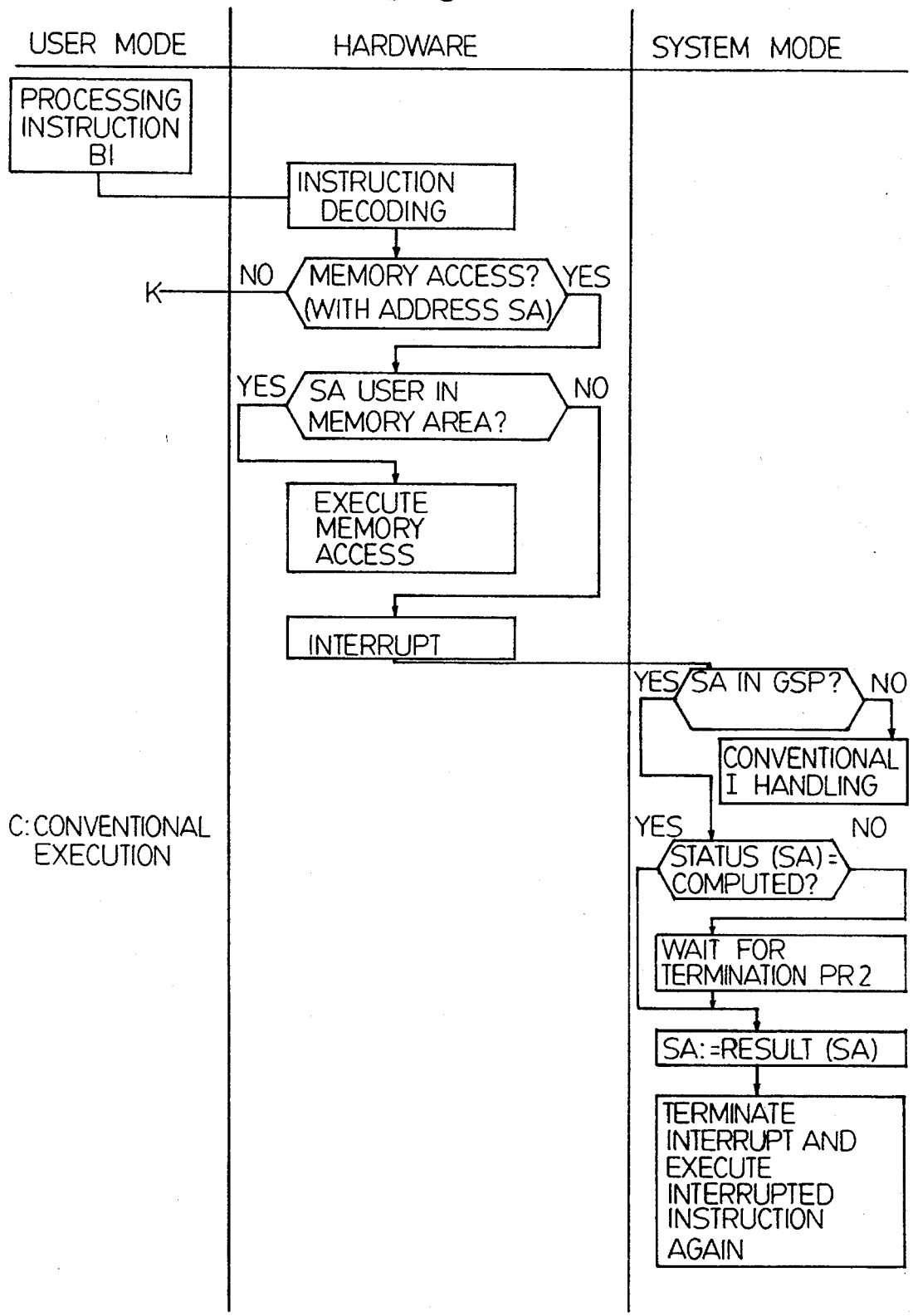

METHOD FOR PROCESSING A USER PROGRAM ON A PARALLEL COMPUTER SYSTEM

This is a continuation of application Ser. No. 952,534, filed as PCT/DE91/00394, May 14, 1991, published as WO91/19251, Dec. 12, 1991, now abandoned.

BACKGROUND OF THE INVENTION

The invention relates to a method for processing a user program on a parallel computer system.

For processing on a parallel computer system, a user program can be divided into a plurality of processes which are processed concurrently on a plurality of processors of the parallel computer system. The situation may therefore arise that for execution a first process on one processor of the parallel computer system requires the result of a second process which is being processed on another processor of the parallel computer system, the result of which is not yet available. In this case, the two processes must be synchronized. One process must assume a wait state and wait for the termination of the other process. Once the result of the other process is available, then the first process can be continued (Interfaces in Computing, Vol. 3, Nos. 3/4, Sept.–Dec. '85, Lausanne CH, pp. 199–216, Elsevier Sequoia, NL).

An example of such program processing is the functional programming style in which a program consists of nested function calls. If a user program of this type runs on a parallel data processing system, the individual functions can run in different processes. A function supplies a result which can be transferred to another function as an argument and processed further there.

Depending on how they use their arguments, functions can be divided into two types:

Strict function

A function is strict if the function requires the values of individual arguments for execution. This is the case with arithmetic operations for example. An addition can only be executed if the values of all the arguments to be added are available.

Non-strict function

A function is non-strict if the values of all the arguments are not required for executing the function, that is to say the arguments are passed on to the function without the function looking at the value. Non-strict operations are assignment operations or PUSH operations for example.

As a result of the parallel processing of such functions, the situation may arise that a function requires as an argument the result of another function which is running in another process on another processor and is not yet terminated. In this case synchronization is necessary. In parallel data processing systems, the problem of the synchronization of functions can be solved as follows, depending on the type of function:

Case 1: A strict function requires as an argument the result of a function that is running concurrently with the strict function.

Since the value of the strict argument is required by the function, in this case the functions must be synchronized, that is to say the strict function must wait for the computation of the argument.

Case 2: A non-strict function has as an argument the result of a function that is running concurrently with the non-strict function.

Since the non-strict function does not require the value of the argument, it is possible, for example, to introduce the concept of the placeholder for this purpose (Halstead, R: "Multilisp: A Language for Concurrent Symbolic Computation", ACM Transactions on Programming Languages and Systems, October 1985). It is possible to use these placeholders as if they were the result of the parallel process. The placeholder is used here instead of the argument for the execution of the non-strict function. Thus, for instance, a PUSH operation can be executed using a placeholder instead of the actual value. By means of this concept, the synchronization would be postponed until the time of the first strict use of the result. With the non-strict use of data it is consequently possible to dispense with synchronization and utilize better the parallel data processing system.

The concept of placeholders must be taken into account for the execution of strict operations. When a function is called, an argument may be available in three different states:

The value of the argument is stored normally, so that it is possible to access the data directly. The strict operation can be executed.

Instead of the argument there is a placeholder which points to the actual result. The result is in a result cell. If the result cell already contains the data, then it is possible to access this data with an additional memory access via the placeholder. The strict operation can then be executed.

A placeholder, that is to say also a result cell, exists but it does not yet contain any result. The process which is to compute the result is still active. In this case synchronization must take place, that is to say the strict operation must wait for the termination of the process and the provision of the result in the result cell.

These three possible states of an argument require different handling. Modern functional language concepts for parallel processing, such as Multilisp for example, which permit a transparent processing of the results of processes free the program developer from the explicit handling of the different argument states. However, as a result the present state is static, that is to say as a rule cannot be decided at the time the user program is translated. The case distinction must therefore be performed at the user program runtime for each data access of a strict operation to its strict arguments.

SUMMARY OF THE INVENTION

The object of the invention is to state a method for the efficient checking of strict arguments for a functional programming language which can be used on parallel computers with standard processors. The objective of the invention is to permit transparent processing of the results of parallel processes in an efficient manner with respect to time and memory space.

This object is achieved by a method for processing a user program on a parallel computer system having the following steps: individual processes of the user program are processed on different processors; each active process can generate further processes that process parts of the user program independently of one another; during the generation of a process a result cell is created for the process in the area of the memory which is locked for the user program; and if a memory access which points to a result cell in the locked memory area is executed during the execution of a first process in the user mode, then an interrupt is generated which causes an interrupt routine to run in the system mode which permits the access to the result cell and checks whether the result of a parallel second process is already available, and if this is not the case suspends the interrupted process until the result data are available.

The advantage of the method according to the invention lies in the fact that the static program length is not extended in comparison with the non-parallel case, it being possible to handle both accesses to normal data and ones to result cells correctly. As a consequence, instructions are saved for each access after translation of the user program. Moreover, the program runtime is not extended for access to normal data in comparison with the non-parallel case.

Other further developments of the invention.

The invention will be explained in greater detail with reference to exemplary embodiments. A program section from a Lisp program is used as an example here, to be precise a pseudocode is used for explanation.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawing, and in which:

FIG. 5 depicts the access of a user program to data that is reached indirectly via the result cell in the FIG. 2 method.

DESCRIPTION OF THE PREFERRED EMBODIMENT

Figure 1:
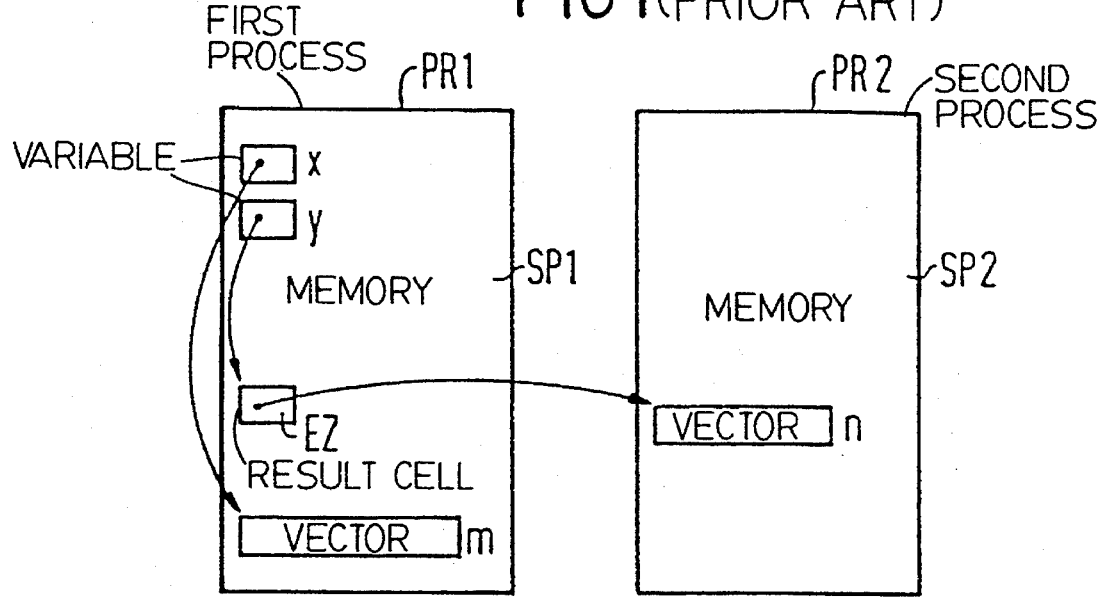
FIG. 1 schematically depicts two processes running concurrently according to the prior art.

It will first be shown with reference to FIG. 1 how the problem is solved without the method according to the invention. When parallel processes are generated, placeholders, that is to say the so-called result cells EZ, are created which store the result of the process once it has terminated. Said result cells EZ can be used in non-strict operations like normal data. In particular, they can be transferred to other functions as an argument.

Two processes which are running concurrently are shown in FIG. 1. A first process is denoted by PR1; and a second process by PR2. Both processes PR1 and PR2 are part of a user program which is processed in parallel. The process PR1 has instructions which contain a memory access to a memory. For example, such an instruction is to be used to access a variable x stored in the memory area SP1 of the process PR1. In the exemplary embodiment, the value of the variable x is contained in the memory area SP1 for the process PR1 and is denoted by the vector m. An instruction may also access a variable y which in turn contains a placeholder. Said placeholder is specified as result cell EZ, in which the value of the variable y may be contained. The value is supplied by the process PR2 and is specified as vector n in the memory area SP2 of the process PR2.

Normal data, such as the variable x for example, and also placeholders, such as the variable y for example, can be transferred as arguments to a strict operation. Since as a rule it is not possible to distinguish between the two cases at the time the user program is translated, corresponding checks must be performed in parallel systems at program runtime. Said checks, as well as the handling of the placeholders EZ, are required for every data access of a strict operation to its strict arguments. This consequently entails a not inconsiderable extra outlay in comparison with non-parallel processing. This extra outlay is all the more a hindrance since during the dynamic execution of a program placeholders occur as arguments of strict operations only to a very small extent.

As a result of the checking of the arguments at runtime and the corresponding handling of the result cells EZ, including the synchronization of the processes, the program code is inflated for each data access to strict arguments. The instructions for data checking to be carried out additionally for each access also extend the program runtime in comparison with the non-parallel case. Both together result in a reduction of the efficiency gain achieved by the parallel processing and the synchronization as late as possible.

This realization and the concomitant outlay will be discussed in greater detail using the example of the functional programming language Lisp. In Lisp the placeholders for the reference to a concurrently computed result are represented as objects of the "future" data type.

In order to obtain the first element of a list x, in Lisp the strict operation (car x) is used. For this, in the non-parallel case the following statements represented in pseudocode are generated by the compiler:

TABLE 1

| ... | | |
|---|---|---|
| loadvar | x, $r_1$ | B1 |
| load | car ($r_1$), $r_2$ | B2 |
| ... | | |

In a first instruction B1 the value of the variable x is loaded into the register R1. Said value of x is a pointer to the start of the list. In a second instruction B2 the contents of the memory location to which the register R1 is pointing are then transferred into the register R2.

Since the instruction car is a strict operation, in the parallel case it must be checked before the first element of the list is accessed, that is to say before the load instruction is executed, whether the value of x is a normal data item or a result cell, that is to say an object of the "future" type. As a result of this, in the parallel case the following statements represented as pseudocode are required for the same operation:

TABLE 2

| | ... | | | |
|---|---|---|---|---|
| | loadvar | x,$r_1$ | | B1 |
| tag1 | chktype | $r_1$, future | +* | B3 |
| | bne | tag3 | +* | B4 |
| | load | status($r_1$),r2 | * | B5 |
| | compare | $r_2$, computed | * | B6 |
| | be | tag2 | * | B7 |
| | wait | $r_1$ | * | B8 |
| tag2 | load | value($r_1$),$r_1$ | * | B9 |
| | b | tag1 | * | B10 |
| tag3 | load | car($r_1$),$r_2$ | | B2 |

After the instruction B1, it is checked in an instruction B3 whether the contents of register R are of the "future" data type. If this is not the case (see instruction B4; bne=branch if not equal), then the data is normal and further program execution is carried out with the instruction B2 (tag3) as in non-parallel execution. However, if the data type "future" is determined, that is to say register R1 points to a result cell, then the instruction B5 is executed and the status of the result cell in register R1 is loaded into the register R2. The instruction B6 determines whether the status in the register R2 is such that the result is already present in the result cell EZ. This is indicated by "computed". If this is not the case, then a wait ensues in accordance with instruction B8 (be= branch if equal) until the result is available in the result cell. If the result is already available, then in accordance with instruction B7 a branch is made to instruction B9 (tag2) and the contents of the register R1 are replaced by the contents of the result cell. A branch (tag1) is subsequently made back to instruction B3 in accordance with instruction B10 (b=branch), and the whole procedure is repeated, to be precise until the contents of register R1 are no longer of the "future" data type. Only then does processing continue in accordance with instruction B2.

In comparison with the non-parallel case, in the parallel case the coding for the access to a strict argument is thus enlarged by 8 pseudocode statements indicated by *, and it consequently increases from 2 to 10 statements, or by the factor of 5. Of these additional eight statements, the two indicated by + are executed additionally for each access, even access to normal data; the remaining six statements only when x is a result cell and synchronization is necessary. The number of statements to be executed thus increases by at least two, or increases at least by the factor of two in comparison with the non-parallel case.

Figure 2:
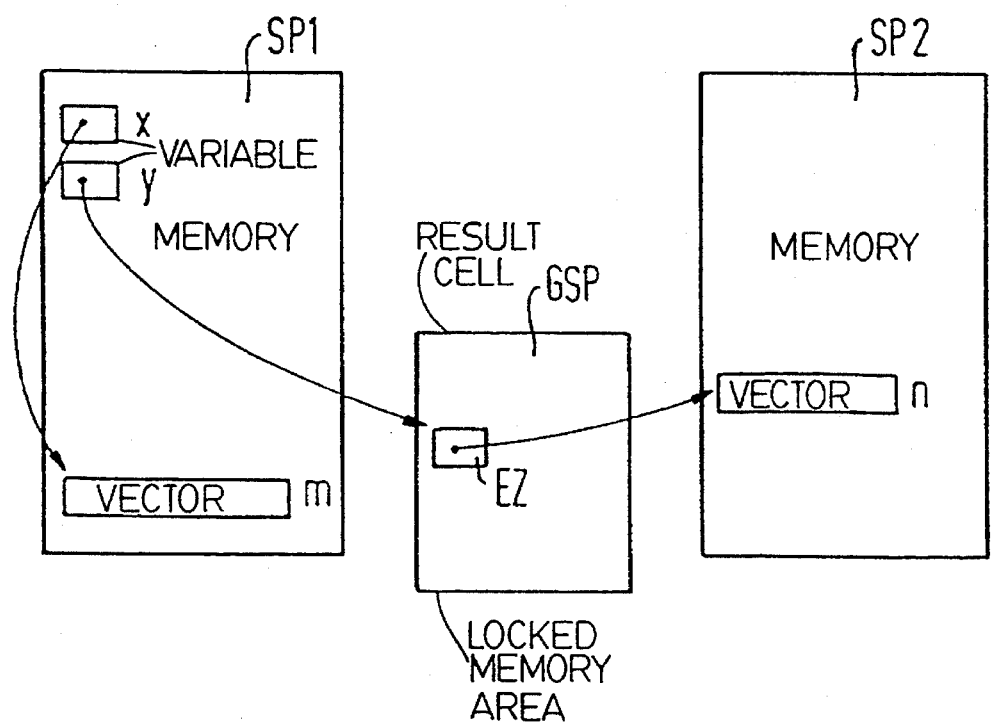
FIG. 2 schematically depicts two processes running concurrently according to the method of the present invention.
Figure 3:
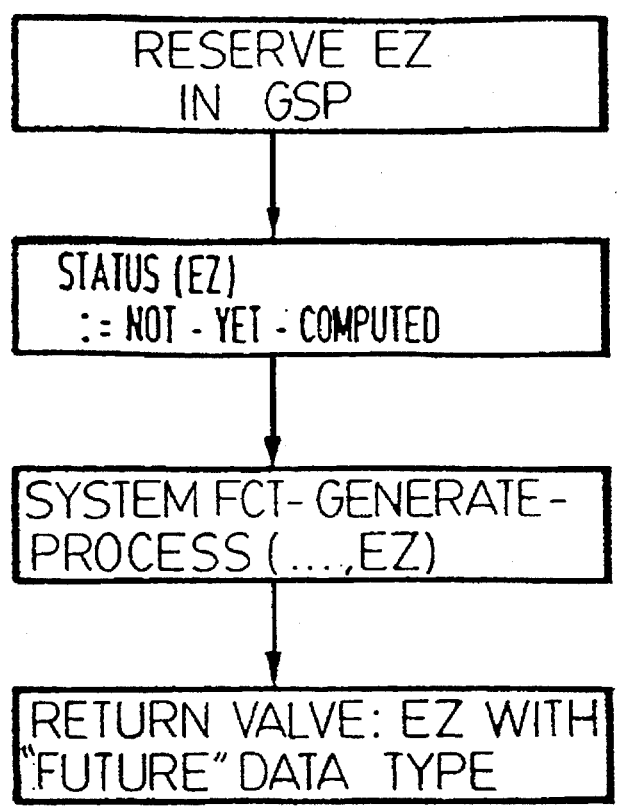
FIG. 3 depicts generation of result cells in the FIG. 2 method.
Figure 4:
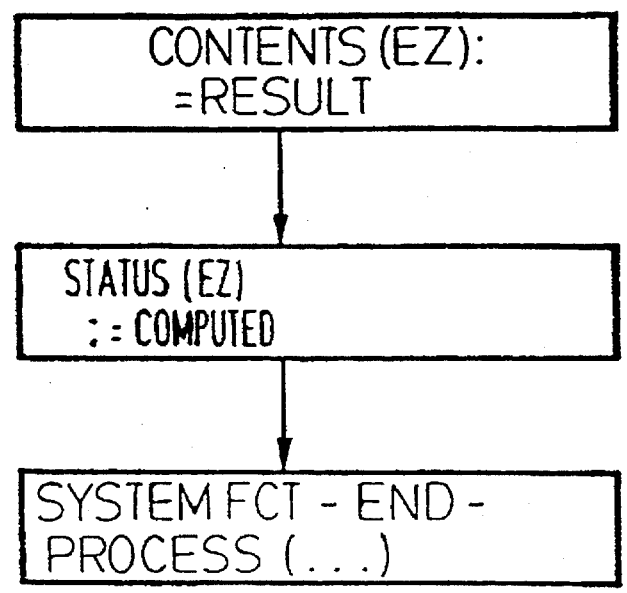
FIG. 4 depicts storage of a result of a process in the result cell in the FIG. 2 method.

In contrast to this method, the method according to the invention proceeds as set out in FIG. 2. In this case the normal case, in which the value of the argument is available and is a normal data item, is handled without additional instructions. In order to achieve this, the placeholders, that is to say the result cells, are stored in a separate memory area which is not accessible to the user program running in the user mode. Said memory area is designated locked memory area GSP. The two processes PR1 and PR2 work as in FIG. 1 via the memory areas SP1 and SP2, the process PR1 in the memory area SP1 and the process PR2 in the memory area SP2. If a memory access that points to a result cell EZ in the locked area GSP is now executed during processing of the process PR1, then the system generates an interrupt. Said interrupt is intercepted by a subsequent interrupt routine which runs in the system mode and permits access to the result cell EZ in the locked area GSP. Since this exception handling is handled like a program error, no additional coding is required. The program length is not extended in comparison with the non-parallel case. No additional instructions need be executed either in the normal case.

The check as to whether an addressed memory area can be accessed by the user program or not is carried out by the system for every memory operation. Consequently there is no additional outlay, rather this feature of the system is utilized to solve the problem. If the memory access authorization is infringed, the hardware generates an interrupt, which is processed by the operating system. The interrupt analysis of the operating system detects the type of error and branches to the interrupt routine provided.

The interrupt routine which is executed for each access to a placeholder checks whether the result of the parallel process is already available. In the positive case the pointer to the placeholder is replaced by a pointer to the result, the interrupt is terminated and the interrupted access is executed again. If the result is not available, however, then the interrupted process remains suspended until the other process has terminated and its result is available. As a result of the renewed execution of the interrupted access, chained result cells are also handled correctly.

The process result is entered in the result cell EZ once the process PR2 has terminated. Since the placeholder can only be accessed in the system mode, two alternatives are possible for this, depending on the process concept implemented:

The result is to be stored in the placeholder by an explicit store operation of the terminating process:

The terminating process is running in the user mode. Therefore an interrupt is performed as for a read access to the placeholder. This can likewise be intercepted by an interrupt routine that runs in the system mode and can store the value in the placeholder.

The result is to be stored implicitly by the process termination routine:

Said routine, which is initiated last by the terminating process PR2, contains the process result as an argument. Since this routine is running in the system mode, it has access to the placeholder and can store the result there without an interrupt being generated.

The important point is that the result cells are located in a memory area which is locked for the user program. Said locked memory area is only accessible in the system mode, not in the user mode. If an access to the locked memory area GSP is attempted in the user mode, then this is interpreted by the operating system as an error and the current program is interrupted in order to determine the error. When determining the error the operating system detects that this is an access to the result cell EZ and the operating system consequently initiates the abovementioned interrupt routine. Said routine performs the synchronization with the other process and triggers the transfer of the data in the result cell EZ to the process PR1. The interrupt routine has access to the locked memory area, since it runs in the system mode.

If the interrupt routine detects that the result is already available in the result cell EZ, then the access path is rerouted and the suspended process PR1 is reactivated with a renewed execution of the interrupted access. In the other case, the still active process PR2 is notified that the process PR1 is waiting for its result. The process PR1 remains suspended and is only reactivated once the process PR2 has terminated.

As a result of the displacement of the detection and handling of the access to result cells to the hardware and the operating system, the coding of the user program remains unchanged in comparison with the non-parallel case. Consequently, no additional instructions are executed in the normal case. This is illustrated in Table 3 below once more:

TABLE 3

| User program (user mode) | | | | |
|---|---|---|---|---|
| loadvar | x, $r_1$ | | Interrupt routine | |
| load | car ($r_1$), $r_2$ B2 | | TR | |
| ... | | | load status ($r_1$),$r_0$ | B5' |
| | | | compare $r_0$, computed | B6' |
| | | | be tag$_1$ | B7' |
| | | | wait $r_1$ | B8' |
| | | tag$_1$ | load value ($r_1$),$r_1$ | B9' |
| | | | return-from-trap | B10' |

During execution of the instruction B2 it is determined that a result cell in a locked memory area GSP is being accessed here. The operating system is thus activated, deter-

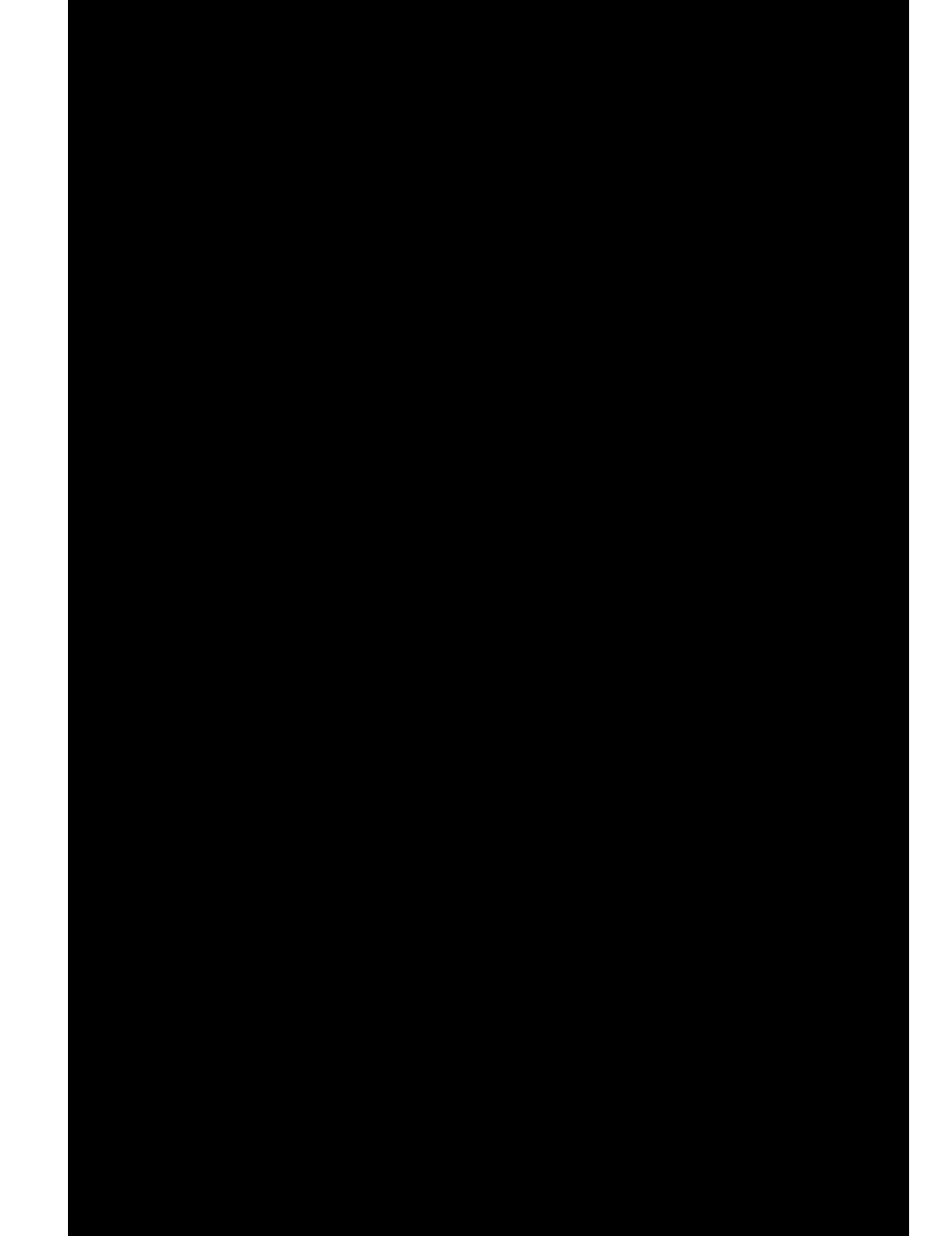

entered in the predetermined result cell and only then is the result made available to the first process and does the execution of the instruction commence with data of the predetermined result cell.

3. The method as claimed in claim 2, wherein upon termination of execution of the second process, the result of the second process is entered in the predetermined result cell.

4. A method for processing a user program on a parallel computer system comprising the steps of:

providing a user program to the parallel computer system;

dividing the user program into individual processes that are respectively processed on different processors of the parallel computer system, active processes of the individual processes being respectively executed in parallel on respective different processors of the parallel computer system, said active processes having arguments that are normal data items and that are placeholders;

creating a result cell for a respective placeholder of a respective active process of said individual processes, in a locked memory area of a memory of the parallel computer system, the locked memory area being unaccessible by the user program;

executing in parallel, in a user mode, at least first and second processes of said individual processes;

storing, by a system routine running in a system mode, a result of the second process in a predetermined result cell in the locked memory area when said result of the second process is associated with a placeholder, and storing a further result of the second process in a user memory area of the second processor when the further result is a normal data item;

generating, when a memory access which points to the predetermined result cell in the locked memory area is executed during execution of the first process in the user mode, an interrupt which causes an interrupt routine to run in a system mode which permits access by the interrupt routine to the predetermined result cell, and checking, by the interrupt routine, if the result from the second process is stored in the predetermined result cell, and if the result from the second process is not present in the predetermined result cell, suspending the first process until the result is present in the predetermined result cell;

wherein for normal data items the first process accesses a respective normal data item in said user memory area of the second processor without interrogation of the locked memory area.

5. The method as claimed in claim 4, wherein after the interrupt routine is initiated and when the result is present in the predetermined result cell, the result is made available by the interrupt routine to the first process and an instruction of the first process is executed; and wherein after the interrupt routine is initiated and when the result is not present in the predetermined result cell, the interrupt of the first process is maintained thereby continuing to suspend execution of the first process until the result of the second process has been entered in the predetermined result cell and only then is the result made available to the first process and does the execution of the instruction commence with data of the predetermined result cell.

6. The method as claimed in claim 5, wherein upon termination of execution of the second process, the result of the second process is entered in the predetermined result cell.

* * * * *